March 3, 1959 A. CLAUD-MANTLE 2,876,031
BOX LID FASTENER

Filed Aug. 20, 1957 3 Sheets-Sheet 1

INVENTOR
A. Claud-Mantle

BY Rockwell & Bartholow

ATTORNEYS

March 3, 1959   A. CLAUD-MANTLE   2,876,031
BOX LID FASTENER

Filed Aug. 20, 1957   3 Sheets-Sheet 2

INVENTOR
A. Claud-Mantle
BY
Rockwell & Bartholow
ATTORNEY

March 3, 1959 A. CLAUD-MANTLE 2,876,031
BOX LID FASTENER
Filed Aug. 20, 1957 3 Sheets-Sheet 3

INVENTOR
A. Claud-Mantle
BY
ATTORNEYS

United States Patent Office 2,876,031
Patented Mar. 3, 1959

2,876,031

BOX LID FASTENER

Arthur Claud-Mantle, Trumbull, Conn., assignor to The Bassick Company, Bridgeport, Conn., a corporation of Connecticut Application August 20, 1957, Serial No. 679,171

4 Claims. (Cl. 292—112)

This invention relates to fasteners and, while not limited thereto, relates to fasteners particularly useful on boxes, especially boxes and like containers used for carrying and storing articles which must be protected from moisture, vapor and the like. Such containers usually include a lower body part, an upper lid part, and gasket means carried by one of the parts and adapted to provide an effective seal between the parts when compressed by the latter through the action of the fasteners.

One object of the invention is to provide a fastener of the type indicated above, having parts of novel construction and arrangement.

Another object is to provide a fastener such as characterized above, which is admirably suited for mounting externally of the box, which is of the gear-operated type, and which includes a rectilinearly movable element pivotally connected to a vertically swingable retainer-engaging member.

Still another object of the invention is to provide a fastener having few and simple parts, which is easy to operate and dependable in service, and which is economical to manufacture.

Other objects of the invention will be apparent from the following detailed description of two forms of the fastener which are illustrated in the accompanying drawings by way of example.

For the protection of instruments and other articles or apparatus requiring protection from moisture, vapor or the like, containers or boxes made of metal or other suitable material have been used and fasteners have been employed with such boxes to exert pressure on the box body and lid to compress a gasket or like sealing member therebetween. However, some of the fasteners heretofore employed on such boxes have been open to certain objections and the present invention contemplates the provision of a fastener overcoming these objections.

Figure 1:
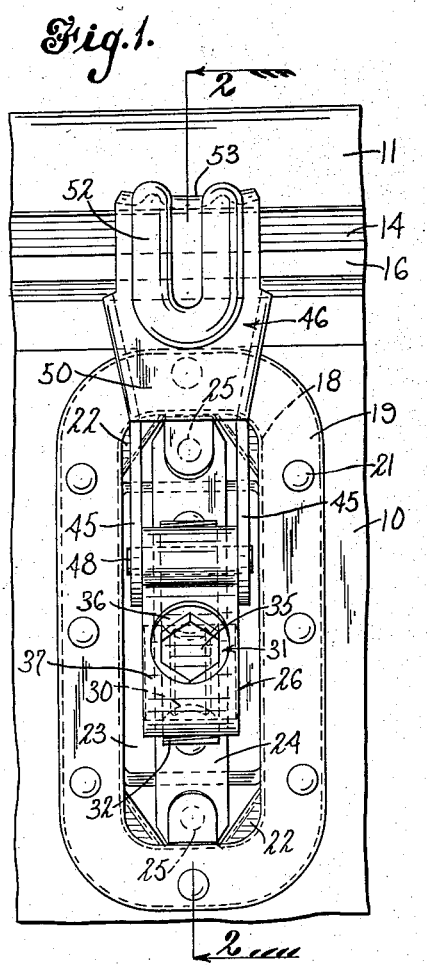
Fig. 1 is a fragmentary external view of a container or box, illustrating the same in elevation and illustrating a fastener embodying the invention, shown in latched condition.
Figure 2:
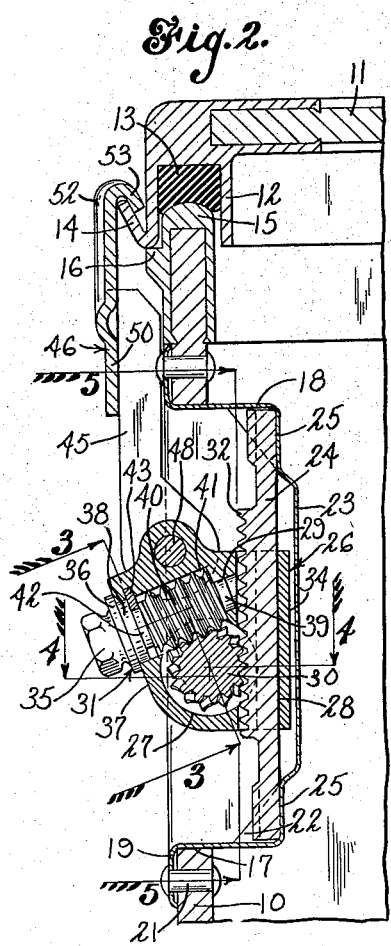
Fig. 2 is a scetional view on line 2—2 of Fig. 1.

In the form shown in Figs. 1 through 7 of the drawings the box body is indicated at 10 and the box lid at 11. At the rim portion thereof the lid 11 has a peripheral inverted channel part 12 and a compressible gasket 13 bottoms in the part 12. The lid 11 is also provided with an integrally formed peripheral flange 14 serving as a retainer for the catch member of the fastener. The flange 14 is inclined outwardly and upwardly from the lower extremity of the part 12, as shown in Fig. 2, for example. The box body 10 is provided with a rim portion 15 extensible into the channel part 12 for engagement with the under side of the gasket 13. The gasket 13 provides an effective seal between the body 10 and the lid 11. Adjacent the rim portion 15 the body 10 is provided with a peripheral outwardly projecting abutment 16 for engagement by the part 12 of the lid to limit closing movement of the lid. In this manner a predetermined compressive force may be exerted on the gasket 13.

Figure 4:
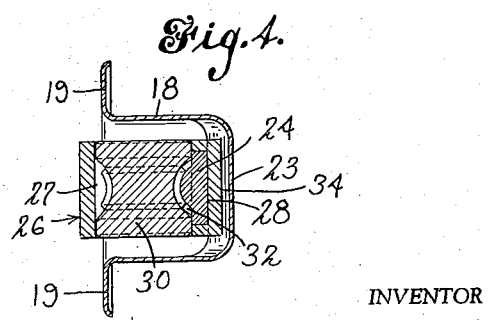
Fig. 4 is a sectional view on line 4—4 of Fig. 2.
Figure 5:
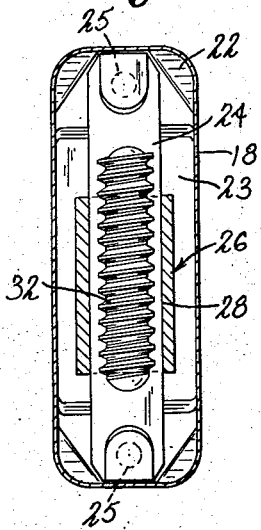
Fig. 5 is a sectional view on line 5—5 of Fig. 2.
Figure 6:
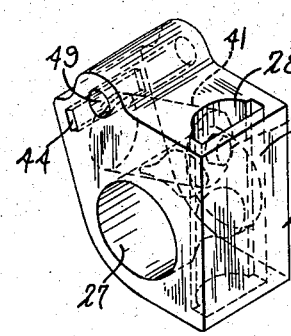
Fig. 6 is a perspective view of a gear housing employed in the fastener.
Figure 7:
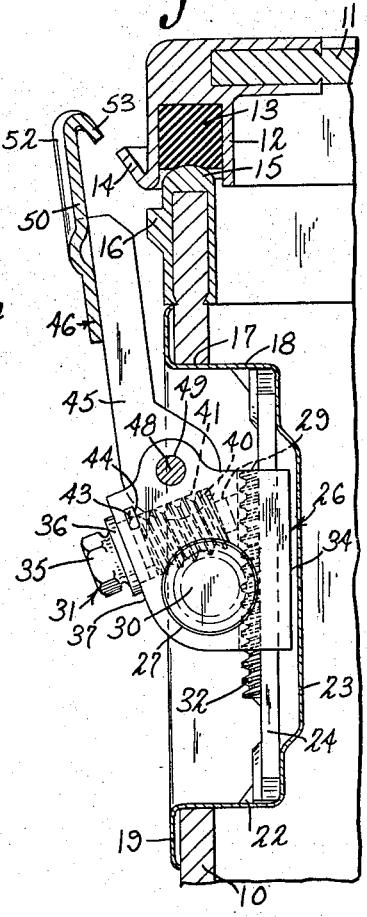
Fig. 7 is a view similar to Fig. 2 but illustrating the fastener in unlatched condition.

Below the abutment 16 the side wall structure of the body 10 is apertured, as at 17, to receive a base plate 18. The base plate 18 forms an upwardly elongated well facing laterally outwardly and substantially flush with the outer face of the side wall structure of the body. The base plate 18 is provided with a rim portion 19 overlying the last-mentioned face and riveted to the body, as at 21. The well formed by the base plate 18 is generally of rectangular outline and has gusset parts 22 formed integrally with the base plate 18 in the corners of the well, as shown in Fig. 5. The upper and lower extremities of the well are shallower than the central region 23 thereof, as shown in Fig. 2. A bar 24 extends between the upper and lower extremities of the well and has its ends welded to the base plate 18, as at 25, the arrangement being such that the middle portion of the bar 24 is spaced from the bottom of the central region 23 of the well, as shown in the last-mentioned view. A gear carrier or housing 26 is mounted on the bar 24 for vertical sliding movement on the latter. As best shown in Fig. 6, the gear housing 26 has a transverse bore 27 extending therethrough intersecting a vertically arranged opening 28 and also intersecting an upwardly inclined bore 29 extending through the outer face of the housing 26. A gear wheel 30 extends into the bore 27 and meshes with a worm shaft 31 extending into the bore 29 through the outer face thereof. The worm wheel also meshes with complemental teeth 32 extending upwardly on the bar 24 in the middle portion thereof. The bar 24 extends through the opening 28 in the housing 26, the bar 24 being generally of flattened cross section. The teeth 32 are formed as an integral part of the bar 24 and project outwardly in the manner best shown in Figs. 2, 4 and 5. The opening 28 in the housing is of complemental outline and closely receives the bar 24 so that there is very little angular play between these parts. The housing 26, which is vertically slidable on the bar 24, has an inner face 34 of planar form, the last-mentioned face being spaced slightly from the deepest part of the well formed by the base plate 18. As will appear hereinafter, the arrangement is such that the gear housing 26 moves up and down only in the deepest part of the well.

The worm shaft 31 is an operating shaft and has a non-round or hexagonal head 35 which may be turned by a suitable wrench. Adjoining and inwardly of the head 35 the shaft 31 is provided with a radial flange 36 overlying the forward face 37 of the gear housing. Adjoining and inwardly of the flange 36 the shaft 31 has a cylindrical portion 38 extending into the bore 29 and forming an outer bearing surface for the shaft. At its inner extremity the shaft 31 has a cylindrical portion 39 of reduced diameter forming an inner bearing surface for the shaft. Immediately outwardly of the portion 39 thereof the shaft 31 has a threaded portion 40 of larger diameter than the portion 39 and bottoming in an outwardly facing enlargement of the bore 29 formed by a counterbore 41. As shown in Fig. 2, the bore 29 intersects the opening 28 through which the bar 24 extends, and immediately outwardly of the threaded portion 40 the shaft 31 is provided with a circumferential groove 42 to receive a key 43. The key 43 prevents axial dislocation of the shaft 31 and is confined in a dead end space 44 (Fig. 6) extending through one side face of the housing 26. When the key 43 is assembled with the shaft and the housing 26, the outer end of the key may be staked to prevent dislocation of the key. The side faces of the housing 26 are of planar form and are closely straddled by the arms 45 of a bifurcated catch member indicated generally at 46. The catch member 46, which is engageable with the retainer 14 to clamp the lid of the box to the box body, is formed of sheet metal and is pivoted to the housing by a pin 48 extending through a bore 49 in the upper part of the housing, the bore 49 being parallel to the bore 27 and extending through the side faces of the housing. The pin 48 extends through the distal rounded ends of the arms 45. At their other ends the arms 45 are interconnected by a web 50 which is ribbed for additional strength, as at 52. The web 50 merges into a hook for engagement with the retainer 14, the hook being indicated at 53. The arms 45 of the catch member are of plate-like form, the outline of one arm 45 being shown in Fig. 2, for example. When it is desired to effect movement of the catch member 46 from the latched position of Fig. 2 to the unlatched position of Fig. 7, the head 35 of the worm shaft is rotated in a direction to raise the gear housing 26 through movement of the worm wheel 30 meshing with the toothed bar 24. Thus, the gear housing is, in effect, a gear-driven element. When the worm shaft 31 has been rotated sufficiently to raise the catch member so that the hook 53 may clear the retainer 14, the catch member may be grasped and swung outwardly from the side of the lid on the axis of the pivot pin 48, if the catch member has not sooner swung to this position by the force of gravity. When the catch member has been swung outwardly from the side of the box lid to the extent shown in Fig. 7, the lid may be lifted off the box body. When the lid is in the position of Fig. 7 and it is desired to clamp the lid to the box body, the catch member is grasped and swung inwardly toward the side of the box lid to extend over the retainer 14. The operating shaft 31 is then rotated to effect rotation of the worm wheel 30 in a direction to lower the gear housing 26 on the toothed bar 24.

Figure 3:
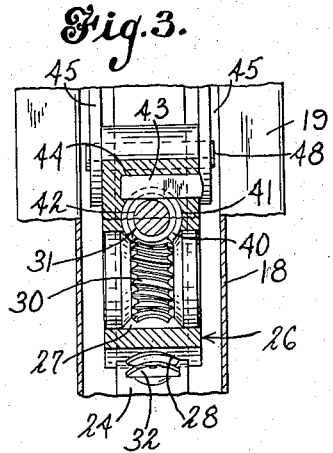
Fig. 3 is a sectional view on line 3—3 of Fig. 2.

As indicated in Fig. 1, the side faces of the worm wheel 30 are substantially flush with the respective side faces of the gear housing 26. The outline of the worm wheel 30 and the form of the teeth thereof are best shown in Figs. 3 and 4. As indicated in Fig. 2, the largest part of the gear housing 26 is recessed in the well formed by the base plate 18. This arrangement tends to prevent the gear housing and its associated parts from striking foreign objects during the transportation or handling of the box. Downward movement of the gear housing 26 in the well is limited by engagement of the channel part 12 of the lid with the abutment 16 of the box body. It may also be noted that when the catch member is in the raised and released position of Fig. 7 the gear housing 26, though raised with the catch member, remains in the deep central portion 23 of the well. It may be noted that because the operating shaft 31 is not at right angles to the axis of the toothed bar 24 the shaft 31 presents a larger threaded area to the teeth of the worm wheel 30, and the arrangement also facilitates the use of a gear housing of smaller mass. The gear housing may have the profile shown in Fig. 2.

In the modified form shown in Figs. 8 through 11, the box is of somewhat different construction, having a lid 55 and a body 56. The opposing edges of the lid 55 and the body 56 are channeled to receive therebetween a compressible gasket 57. In the instant form the opposing edges of the lid 55 and the body 56 meet when the lid is in latched condition so that a predetermined compressive force may be exerted on the gasket 57. In this form, the gear housing, indicated generally at 60, is not vertically movable and is not recessed in the side wall structure of the box body. The housing 60 is provided with ears 61 for attachment to the body 56 by fasteners such as rivets 62. The body 63 of the gear housing is generally of the same shape as the gear housing 26 described above, but is inverted so that the worm shaft 31 extends below the worm wheel 30 instead of above it. An integrally formed arm 64 projects upwardly from the top of the body 63, the arm being strengthened by a gusset portion 65 integral with both the arm 64 and the body 63. The gear housing 60, with its appurtenant parts, is shown to advantage in Fig. 10.

Figure 9:
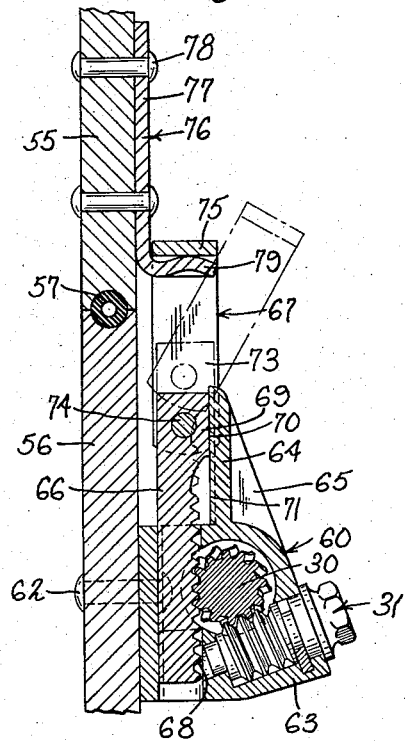
Fig. 9 is a sectional view taken on line 9—9 of Fig. 8.
Figure 10:
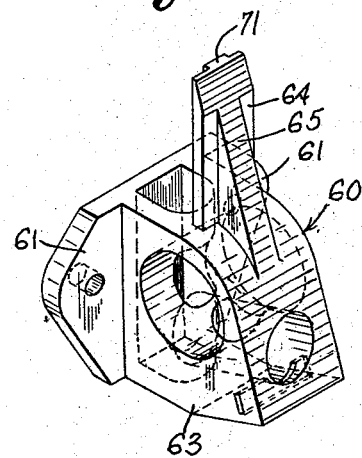
Fig. 10 is a perspective view of a gear housing employed in the modified form of the fastener.
Figure 11:
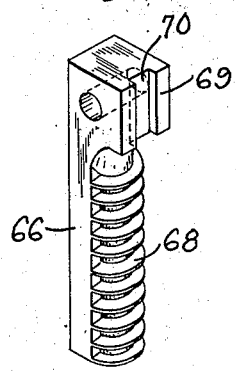
Fig. 11 is a perspective view of a movable part extensible into the last-mentioned gear housing.

In this form, the worm wheel 30 cooperates with a toothed bar 66, best shown in Fig. 11. The bar 66, instead of being in fixed relation to the box body like the bar 24 described above, is vertically movable to raise and lower the catch member 67. The toothed bar 66 extends into the housing 60, as indicated in Fig. 9. As shown in Fig. 11, the bar 66 has teeth 68 formed on one side thereof and extending from the lower extremity of the bar to a point a short distance below the upper extremity of the bar. At its upper end the bar 66 is provided with an overhanging part 69 generally of rectangular shape and having a vertically extending channel 70 formed therein. The arm 64 extending upwardly from the body 63 of the gear housing and rigid therewith is provided with a tongue 71 which extends into the channel 70 formed in the bar 66 to guide the movements of the bar. The tongue 71 extends the length of the arm 64, as shown in Fig. 9.

Figure 8:
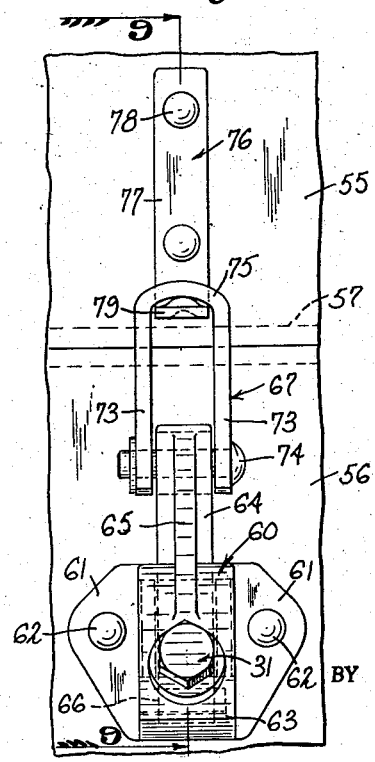
Fig. 8 is a view similar to Fig. 1 but illustrates a modified form of the fastener and a box of somewhat different construction.

As shown in Fig. 8, the catch member 67, instead of being of hook form like the catch member 46 described above, is, in this case, also of bifurcated form but of bail-like construction. The catch member 67 has plate-like arms 73 straddling the bar 66 and pivoted to the part 69 thereof by a pivot pin 74 extending through the bar 66 and the member 67. The part 75 which interconnects the arms 73 of the catch member has latching engagement with a retainer 76 and is somewhat rounded, as shown in Fig. 8. The retainer 76 is, in this case, formed in part by an upwardly extending strap portion 77 which is riveted to the side wall structure of the box lid, as at 78. At the lower end of the strap-like portion 77 the retainer has a flange 79 projecting outwardly from the side wall structure of the box lid in the manner shown in Fig. 9. As shown in this view, the flange 79 may be somewhat rounded. The latched position of the catch member 67 is shown in full lines in the last-mentioned view, and the last-mentioned member is shown unlatched in broken lines in this view.

From the foregoing it will be understood that when the catch member 67 is in latched position and one desires to remove the lid of the box, the operating shaft 31 must be rotated by a suitable wrench in a direction to raise the toothed bar 66 through the operation of the worm wheel 30 meshing with both the shaft 31 and the bar 66. When the bar 66 has been raised a short distance in this manner, one may then grasp the catch member 67 to swing it outwardly on the axis of the pin 74 so that the flange 79 will clear the catch member 67 when the box lid is lifted upwardly from the box body. To latch the lid, the member 67 is first grasped and swung over the flange 79. The operating shaft 31 is then rotated in the opposite direction to effect a downward pull on the bar 66. The bar 66 has only a straight-line movement, and movement of the bar is very effectively guided by the arm 64 stationary with the gear housing 60.

From the foregoing disclosure of two forms of the fastener, it will be apparent that a latching or clamping device is provided which is admirably suited for mounting externally of a box, which is of the gear-operated type, and which includes a rectilinearly movable element pivotally connected to a vertically swingable retainer-engaging member. In this manner a very strong downward pull on a box lid may be effected. Moreover, when the device is in latched condition it strongly resists forces tending to spring open the box lid. It will be understood that the rectilinearly movable element of the device is, in effect, a gear-driven element and in each instance is very effectively guided in its movements while being mounted in a very secure manner. Of course, it will be understood that, if desired, the rectilinearly movable gear-driven element may be mounted on the box lid so that the fastener is, in effect, inverted. The fastener has few and simple parts and is easy to operate. It is dependable in service and economical to manufacture.

While two forms of the fastener have been illustrated and described above, it will be apparent that the fastener is susceptible of various modifications and changes in details without departing from the principles of the invention and the scope of the appended claims.

What I claim is:

1. A fastener of the gear-operated type comprising a housing for stationary mounting on a container element, an operating shaft constituted by a worm extending into the front of the housing, a worm wheel in the housing meshing with the worm and extending transversely thereof, and a toothed bar vertically arranged in the housing for up and down movement and meshing with said worm wheel, said bar carrying a retainer-engaging member, said bar and said shaft being disposed in planes forming an acute angle, and said worm wheel being disposed in said angle.

2. A fastener of the gear-operated type comprising a mounting plate for stationary mounting on a container element, a vertically arranged toothed bar fixed to the plate, a housing slidably mounted on said bar, an operating shaft constituted by a worm extending into the front of the housing, and a worm wheel in the housing meshing with said shaft and the toothed bar and extending transversely of the latter, said bar carrying a retainer-engaging member, said bar and said shaft being disposed in planes forming an acute angle, and said worm wheel being disposed in said angle.

3. In a fastener for releasably securing together a box body element and a lid element, a vertically movable gear-driven element having only a straight-line movement for slidable mounting one one of the elements, gear means for effecting vertical movement of the gear-driven member, and a swingable retainer-engaging catch member pivoted on said gear-driven member for co-operation with a retainer on the other of said elements, said gear means including a worm constituting an operating shaft, a worm wheel meshing with the worm and a fixed upright toothed bar with which said worm wheel has toothed engagement, and said gear-driven member including a carrier for the worm and worm shaft and being slidable on the bar.

4. In a fastener for releasably securing together a box body element and lid element, a vertically movable gear-driven element having only a straight-line movement for slidable mounting on one of the elements, gear means for effecting vertical movement of the gear-driven member, and a swingable retainer-engaging catch member pivoted on said gear-driven member for co-operation with a retainer on the other of said elements, said gear means including a worm constituting an operating shaft and a worm wheel meshing with the worm, a stationary housing for the worm and worm wheel, and said gear-driven member comprising a toothed bar meshing with the worm wheel and being slidable in the stationary housing.

References Cited in the file of this patent
UNITED STATES PATENTS

| | | |
|---|---|---|
| 1,931,850 | Moore | Oct. 24, 1933 |
| 2,036,151 | Lang | Mar. 31, 1936 |
| 2,719,745 | Kent et al. | Oct. 4, 1955 |
| 2,751,240 | Claud-Mantle | June 19, 1956 |